UNITED STATES PATENT OFFICE 2,415,009

BUTADIENE STABILIZATION

Lewis F. Hatch, Austin, Tex., and David E. Adelson and Billee O. Blackburn, Berkeley, Calif., assignors to Shell Development Company, San Francisco, Calif., a corporation of Delaware No Drawing. Application October 25, 1941, Serial No. 416,594

6 Claims. (Cl. 260—666.5)

This invention relates to the art of stabilization of butadiene, and to the improved compositions obtained thereby.

When butadiene is exposed to the action of air and/or light, a gradual polymerization takes place with the formation of resinous products. Also, it has been found that the storage of butadiene in ferruginous containers, such as iron drums, promotes corrosion of the containers, the rust thus formed, in turn, promoting the polymerization of the butadiene. Although plastic materials, such as synthetic rubber, are produced by the polymerization of butadiene, it is frequently desirable, if not essential, that the butadiene be stabilized against such polymerization so that it can be stored for relatively long periods of time following its preparation. This is due to the fact that butadiene finds many uses, such as in the manufacture of chloroprene or of products of emulsion polymerization of the butadiene with other co-polymerizable compounds of the type of styrene, vinyl-type cyanides, such as acrylic or methacrylic acid nitriles, and the like, in which case it is desirable to maintain the butadiene in the monomeric state at least until its utilization for such purposes.

It is therefore among the objects of the invention to provide a process for inhibiting polymerization of butadiene. A further object of the invention is to inhibit corrosion or rusting of ferruginous containers in which butadiene is stored. A still further object of the invention is to inhibit peroxide formation in monomeric butadiene, such peroxides generally tending to promote polymerization of the butadiene.

It has now been discovered that the above and other objects may be attained by incorporating certain organic compounds into the butadiene to be stabilized. More specifically, it has been discovered that certain aromatic compounds, when added to butadiene-1,3, will inhibit or even completely prevent peroxide formation in the butadiene, will stabilize it against polymerization, and also prevent corrosion or rusting of ferruginous containers employed for the storage and/or transportation of butadiene thus stabilized. Generically stated, the aromatic compounds which, according to the present invention, are suitable as stabilizing agents for the butadiene have the general formula

wherein X is an aryl radical, R is either a hydrogen atom or a hydrocarbon radical, and Y is either a hydroxyl radical, an amino radical or substituted amino radical having a hydrocarbon radical attached thereto in lieu of one of the hydrogen atoms thereof. The following is a list of representative compounds falling within the above-defined general class and suitable as stabilizing agents for butadiene: para-amino phenol, ortho-amino phenol, N-methyl para-amino phenol, N-phenyl para-amino phenol, N-benzyl para-amino phenol, 1,4-amino naphthols, 2,1-amino naphthols, N-benzyl-1,4-diamino benzene, ortho-phenylene diamine, para-phenylene diamine, 1,2-naphthylene diamine, N-methyl 1,4-naphthylene diamine, N-benzyl 1,4-naphthylene diamine, and the like and their homologues. Of the aromatic compounds falling within the class described above as being suitable as stabilizing agents, those in which the amino or substituted amino radical on the one hand, and the hydroxyl or amino or substituted radical on the other, are either in the ortho or para position were found to be particularly suitable. Also, ortho compounds of the type of amino naphthols and the naphthols in which the hydrocarbon radical is substituted for one of the hydrogens of the amino group, as well as the naphthyl diamines and substituted naphthyl diamines may be used. The mono-nuclear aromatic compounds falling within the above-described general class are particularly suitable as stabilizing agents. The hydrocarbon radicals attached to the nitrogen atoms of the described compounds may be either open-chain or cyclic hydrocarbon radicals. In other words, they may consist of either saturated or unsaturated alkyl, aryl or aralkyl radicals, such as methyl, ethyl, propyl, butyl, phenyl, naphthyl or benzyl radicals.

The proportion in which the above stabilizing agents may be incorporated with the butadiene depends in part upon the length of time for which it is desired to stabilize the butadiene, the composition and condition of the container employed for its storage and/or transportation and the particular agent or agents employed for purposes of stabilizing the butadiene. While any desired proportion of the stabilizing agent or mixtures thereof may be employed, the use of up to about 5% by weight thereof in the stabilized composition is generally sufficient. It must be noted, however, that the relatively low solubility of many of the above-outlined and specifically described amino compounds in the butadiene generally limits the concentration of such aromatic amino compounds to considerably below 1% by weight of the stabilized product. Also, it was found that relatively low concentrations, i. e. in the order of from 0.01% to 0.03%, or even less, are generally sufficient to inhibit polymerization of the butadiene and the corrosion or rusting of the ferruginous containers used for its storage and/or transportation.

The following detailed examples are given for the purpose of illustrating the present invention and the advantages derived from stabilizing butadiene-1,3 with the above-defined aromatic amino compounds. It is understood that the agents mentioned in these examples are given by way of illustration only and that other aromatic compounds of the group defined above, which compounds have either a hydroxyl radical and an amino radical or two amino radicals attached to two different carbons of an aryl radical, may be employed with the same or like success.

*Example I*

Para-amino-phenol was added to liquefied butadiene-1,3 in such an amount that its concentration in the stabilized product was equal to about 0.1% by weight. This liquid product was then introduced into an evacuated steel bomb. After thus filling the bomb, the inlet valve was closed, and the filled bomb was stored for a period of about 13½ months. At the end of this period of time the butadiene was withdrawn from the container in which it was thus stored. This butadiene was found to be colorless and substantially free from any non-volatile materials, i. e. products of butadiene polymerization. Upon sawing off the ends of the storage bomb, and upon examining the inner walls of the container, it was found that they were very clean and substantially free from rust.

For purposes of comparison, butadiene which was not stabilized by the addition of any agent or agents, was introduced into a similar steel bomb, and was stored for the same period of time as the one containing the stabilized butadiene. Upon withdrawal of the butadiene at the end of the 13½ month period, it was found that the butadiene contained a rusty sediment. Also, the inner walls of the bomb were highly corroded. Since the greatly increased surface presented by the rust affords an opportunity for the formation of polymerization centers, the presence of such rust in containers for butadiene storage is highly undesirable.

An analysis of the above tests shows that the presence of even small amounts of the mentioned nitrogen-containing phenol in the butadiene prevents the corrosion of the walls of ferruginous containers employed for its storage, and thus retards or even completely prevents any undesirable polymerization of the butadiene stored in such containers.

Since it is known that the presence of peroxides promotes the polymerization of unsaturated hydrocarbons, several tests were run to determine the inhibiting effect of the herein defined class of aromatic compounds on the peroxide formation in butadiene.

*Example II*

A mixture consisting of 5% butadiene and 95% toluene was analyzed by the Yule and Wilson method and found to have a peroxide number of 0.15. This mixture was then subjected to an accelerated oxidation test. For this purpose, a 150 cc. sample of the mixture was placed into a glass tube disposed in a stainless steel autoclave, the space above the sample being filled with air under a pressure of one atmosphere. After closing, the autoclave was heated to a temperature of about 100° C. At the end of 2½ hours, the peroxide number was found to be 3.22, while at the end of 5 hours of the accelerated oxidation this peroxide number was 3.16. The peroxide numbers given herein refer to milli-equivalents of active oxygen per liter of solution, as determined by the aforementioned Yule and Wilson method.

*Example III*

A butadiene-toluene solution containing 5% butadiene was mixed with para-phenylene-diamine in an amount equal to 0.02% by weight of the butadiene. This mixture was then subjected to accelerated oxidation test according to the process described in the above example. The initial peroxide number was 0.07. At the end of 2½ hours of treatment it was only 0.13, while at the end of 5 hours it rose to only 0.30.

*Example IV*

A butadiene-toluene solution similar to the one employed above was used. N-benzyl-para-amino-phenol was added to this solution in an amount equal to 0.02% by weight of butadiene in the solution, the stabilizer being added as a 40% solution in methyl alcohol. When subjected to the above-described accelerated oxidation test, it was found that the peroxide number rose from an initial 0.11 to 0.17 at the end of 2½ hours, while at the end of 5 hours it was only 0.24.

A comparison of the results obtained in the tests described in Examples II, III and IV shows that the presence of even small percentages of para-phenylene-diamine or N-benzyl-para-amino-phenol inhibits peroxide formation in butadiene. The low peroxide content of butadiene thus stabilized inhibits any undesirable polymerization of the butadiene subjected to storage and/or transportation.

It was noted that butadiene, inter alia, is used as one of the reactants in co-polymerization reactions with other co-polymerizable compounds, e. g. vinyl type cyanides. Such co-polymerizations are frequently effected by forming an aqueous emulsion containing the co-polymerizable reactants, and by promoting the reaction by the addition of a catalyst, such as ammonium persulfate, or the like, to the emulsion thus formed. Generally, when the butadiene stabilizers described hereinabove are employed in relatively small amounts, e. g. 0.02% or less by weight of the butadiene, such quantities of the stabilizing agent, although inhibiting undesirable polymerization, will not affect to any substantial degree its co-polymerization with the vinyl type cyanides. At most, in order to obtain satisfactory yields of products of emulsion co-polymerization, it is but necessary to increase slightly the quantity of the reaction-promoting catalyst to be employed during the co-polymerization reaction. On the other hand, the presence of relatively large quantities of the defined stabilizing agents will inhibit its normal emulsion co-polymerization with acrylonitrile, or the like. For example, no products of such co-polymerization were obtained when para-amino-phenol was present in a concentration of about 0.1% by weight of the butadiene. Therefore, when butadiene is stabilized with relatively large amounts of the stabilizing agents, it is generally preferable or even necessary to pre-treat the thus stabilized butadiene prior to its use in polymerization reactions. This may be effected by distillation, caustic or alkali washing and the like. It is to be noted that in the case of the aromatic diamines, effective removal thereof from butadiene stabilized therewith may be effected by washing by an acid which will not detrimentally affect the butadiene. Usually, such a treatment should be followed by a water wash.

Although the present invention has been described with particular reference to the stabilization of butadiene with para-amino-phenol, N-benzyl-para-amino-phenol or para-phenylene-diamine, it is to be understood that other agents of the described group may also be used.

We claim as our invention:

1. Monomeric butadiene stabilized with between about 0.01% and about 0.02% by weight of para-amino-phenol.

2. Monomeric butadiene stabilized with between about 0.01% and about 0.02% by weight of para-phenylene-diamine.

3. Monomeric butadiene stabilized with between about 0.01% and about 0.02% by weight of N-benzyl-para-amino-phenol.

4. Monomeric butadiene stabilized with between about 0.01% and about 0.02% by weight of a para-amino-phenol having an aryl radical substituted for a hydrogen atom of the amino group.

5. Monomeric butadiene stabilized with between about 0.01% and about 0.02% by weight of a para-amino-phenol containing a hydrocarbon radical directly attached to the nitrogen atom of the amino group.

6. Monomeric butadiene stabilized with between about 0.01% and about 0.02% by weight of a compound having the general formula

wherein X is an aryl radical, R is a member selected from the group consisting of the hydrogen atom and hydrocarbon radicals, and Y is a member selected from the group consisting of OH, $NH_2$ and $NHR_1$, wherein $R_1$ is a hydrocarbon radical.

LEWIS F. HATCH.
DAVID E. ADELSON.
BILLEE O. BLACKBURN.